US012240250B1

(12) United States Patent
Hauptmann et al.

(10) Patent No.: US 12,240,250 B1
(45) Date of Patent: Mar. 4, 2025

(54) METHOD FOR FEEDBACK CONTROL OF THE TEMPERATURE OF AN INK IN INKJET PRINTING

(71) Applicant: Heidelberger Druckmaschinen AG, Heidelberg (DE)

(72) Inventors: Gerald Hauptmann, Bammental (DE); Ernst-Christian Maschler, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 18/810,769

(22) Filed: Aug. 21, 2024

(30) Foreign Application Priority Data

Aug. 21, 2023 (DE) ..................... 10 2023 122 268.6

(51) Int. Cl.

| | |
|---|---|
| ***B41J 2/195*** | (2006.01) |
| ***B41J 2/02*** | (2006.01) |
| ***B41J 2/045*** | (2006.01) |
| ***B41J 2/175*** | (2006.01) |
| ***B41J 2/18*** | (2006.01) |

(52) U.S. Cl.
CPC ........... *B41J 2/195* (2013.01); *B41J 2/04563* (2013.01); *B41J 2/17596* (2013.01); *B41J 2/18* (2013.01); *B41J 2002/022* (2013.01)

(58) Field of Classification Search
CPC .... B41J 2/195; B41J 2/04563; B41J 2/17596; B41J 2/18; B41J 2002/022
See application file for complete search history.

(56) References Cited

U.S. PATENT DOCUMENTS 5,736,995 A 4/1998 Bohorquez et al.
6,575,548 B1 * 6/2003 Corrigan, III ....... B41J 2/04543 347/19
7,118,186 B2 * 10/2006 Lapstun ................. H04N 1/642 347/14
11,919,291 B2 * 3/2024 Shimizu ............... B41J 2/04581

FOREIGN PATENT DOCUMENTS

CN 104417069 A 3/2015
CN 115848022 A 3/2023
DE 69213542 T2 3/1997

(Continued)

Primary Examiner — An H Do
(74) *Attorney, Agent, or Firm* — Laurence A. Greenberg; Werner H. Stemer; Ralph E. Locher

(57) ABSTRACT

A method for feedback control of ink temperature in inkjet printing includes pumping ink through supply and return lines of an ink distributor and between these lines through print heads supplied in parallel with the ink, comparing a temperature actual value with a predefined temperature setpoint value and calculating a manipulated variable for a setpoint value of an ink heater from a setpoint/actual value deviation. A flow sensor is operated between the supply and return lines in parallel with the print heads and measures the flow of the ink or generates a measurement signal dependent on the flow. The flow or the measurement signal is converted by a predefined characteristic curve into a temperature auxiliary value used as the temperature actual value or temperature setpoint value for feedback control. This enables continuous unimpaired production by inkjet printing, particularly upon changes in viscosity of the ink in industrial inkjet printing.

8 Claims, 2 Drawing Sheets

(56) References Cited

FOREIGN PATENT DOCUMENTS

| | | | |
|---|---|---|---|
| DE | 102022109615 | A1 | 10/2023 |
| EP | 3222429 | A1 | 9/2017 |
| EP | 3741571 | A1 | 11/2020 |
| JP | 2009285845 | A | 12/2009 |
| JP | 2022166938 | A | 11/2022 |
| JP | 2023053593 | A | 4/2023 |
| WO | 2023285291 | A1 | 1/2023 |

* cited by examiner

METHOD FOR FEEDBACK CONTROL OF THE TEMPERATURE OF AN INK IN INKJET PRINTING

CROSS-REFERENCE TO RELATED APPLICATION

This application claims the priority, under 35 U.S.C. § 119, of German Patent Application DE 10 2023 122 268.6, filed Aug. 21, 2023; the prior application is herewith incorporated by reference in its entirety.

FIELD AND BACKGROUND OF THE INVENTION

The invention relates to a method for feedback control of the temperature of an ink in inkjet printing, in which the ink is pumped through a supply line and a return line of an ink distributor and between these lines through print heads supplied in parallel with the ink, a temperature actual value is compared with a predefined temperature setpoint value and a manipulated variable for a setpoint value of an ink heater is calculated from a setpoint/actual value deviation.

The invention concerns the technical field of the graphics industry, and therein particularly the field of industrial, i.e. high-productivity inkjet printing on flat substrates, i.e. the application of very fine drops of liquid ink corresponding to an image onto printing materials in the form of sheets, webs, films or labels, preferably formed of paper, cardboard, paperboard, plastic, metal or composite material. In particular, the invention concerns the subsidiary field of circulating the supply of liquid ink to print heads that eject ink drops while feedback-controlling the temperature of the liquid ink.

DESCRIPTION OF THE RELATED ART

In industrial inkjet printing, it is already known to provide a device for the circulating supply of ink fluid to a plurality of inkjet print heads that are supplied in parallel with ink, that is to say to provide an ink circuit. Besides a storage container for the ink, such a device includes an ink distributor (also referred to as a manifold) with a supply line to the heads and a return line to the container as well as at least one pump for delivering the ink through the lines.

In industrial inkjet printing, it is already known to measure the hydrodynamic pressure of the ink fluid in the ink distributor continuously and to keep it at a predefined setpoint pressure by using feedback control. For that purpose, at least one pressure sensor is provided in the ink distributor.

In industrial inkjet printing, it is furthermore already known to thermally adjust, in particular to heat, the circulating ink fluid during printing operation, i.e. to measure the temperature continuously and keep it at a predefined setpoint temperature by using feedback control. That is primarily done in order to set a viscosity of the ink that is required for unimpaired printing. For that purpose, at least one temperature sensor is provided in the ink distributor.

German Application DE10 2022 109 615 A1 discloses a method for continuously determining and varying the viscosity of inkjet ink. The ink temperature is used as a manipulated variable for feedback control of a pump speed in the ink circuit.

European Application EP3741571 A1 discloses a method for monitoring and setting the ink viscosity during the operation of a so-called "continuous inkjet" printer.

European Patent Translation DE 69213542 T2, corresponding to U.S. U.S. Pat. No. 5,168,284, discloses an apparatus for feedback control of the temperature of an inkjet print head or thermal print head with a closed-loop control system.

International Publication WO 2023/285291A1 discloses feedback control which retrieves the volumetric flow from a supply pump. That, however, may lead to problems when the speed of the supply pump is too inaccurate for such a purpose.

In inkjet printing machines available on the market, for example the "Gallus Labelfire" or the "Gallus One" from Gallus Ferd. Rüesch AG, Switzerland, the temperature necessary for unimpaired drop formation is feedback-controlled with the aid of two temperatures of the ink that are measured directly at two different locations in the ink distributor.

Feedback control of the ink temperature which uses only the measured temperature of the ink at different locations as input variables may have the disadvantage that it does not detect, and therefore cannot correct either, a variation of the rheological properties of the ink (for example due to production variations between the batches from the manufacturer or due to premature ageing of the ink). However, the rheological properties of the ink are crucial for unimpaired drop formation.

The measurement of the temperature of the ink is therefore only an aid for setting the viscosity of the ink, and this may lead to two practical disadvantages: since a variation of the ink is not detected, predictive maintenance or a warning to the machine operator is not possible; once the drop formation no longer proceeds unimpaired because of a change in the ink viscosity, production can no longer be carried out.

The viscosity of the ink could be measured directly by using a viscometer. In the scope of a feasibility study, however, it has been found that the installation of viscometers available on the market and their installation in an inkjet printing machine may lead to economically unacceptable additional costs.

Elsewhere, it is also already known to measure the flow of an ink. In connection with a "continuous inkjet" printer, European Application EP3222429A1, corresponding to U.S. Pat. Nos. 10,065,427 and 10,464,334, discloses a component, or an arrangement, for measuring the flow rate of an ink sent to an inkjet print head.

SUMMARY OF THE INVENTION

It is accordingly an object of the invention to provide an improved method for feedback control of the temperature of an ink in inkjet printing, which overcomes the hereinafore-mentioned disadvantages of the heretofore-known methods of this general type and which in particular enables continuous unimpaired production by inkjet printing, particularly in the event of changes in the viscosity of the ink.

Achievement of the Object by the Invention

With the foregoing and other objects in view there is provided, in accordance with the invention, a method for feedback control of the temperature of an ink in inkjet printing, in which the ink is pumped through a supply line and a return line of an ink distributor and between these through print heads supplied in parallel with the ink, a temperature actual value is compared with a predefined temperature setpoint value and a manipulated variable for a setpoint value of an ink heater is calculated from a setpoint/ actual value deviation, a flow sensor is operated between the supply line and the return line and in parallel with the print heads and measures the flow of the ink or a measurement signal dependent on the flow is generated, the flow or the measurement signal is converted by a respectively predefined characteristic curve into a temperature auxiliary value and this temperature auxiliary value is used as the temperature actual value or as the temperature setpoint value for the feedback control.

Advantageous and therefore preferred developments of the invention may be found in the dependent claims as well as the description and the drawings.

Advantageous Embodiments and Effects of the Invention

The invention advantageously enables continuous unimpaired production by inkjet printing, particularly in the event of changes in the viscosity of the ink.

The invention uses a measurement of the flow of the ink or a measurement signal dependent on the flow. The flow changes when the viscosity of the ink changes. A variation of the viscosity is consequently identified by using this measurement. The invention furthermore uses a predefined characteristic curve in order to convert the result of the measurement (measurement value or measurement signal) into an auxiliary value. This auxiliary value is referred to as a "temperature auxiliary value" since it is not a measured temperature and according to the invention it is used for temperature control of the ink. Lastly, the invention uses this auxiliary value either as an actual value or as a setpoint value for the temperature control. The invention therefore includes two variants. The temperature of the ink and therefore its viscosity are varied by using the feedback control. Each of the two variants may be used in order, by using a variation of the ink temperature, to induce a desired variation of the ink viscosity and therefore to keep the ink viscosity in a (preferably predefined and preferably narrow) range in which unimpaired production of printed products is possible. In the preferred variant the temperature auxiliary value is used as a temperature actual value.

According to the invention, the optimal conditions for the drop formation when ejecting the ink from the nozzle are feedback-controlled by at least one of the ink temperatures measured previously in the prior art being replaced with an ink temperature calculated from the ink flow measured at at least at one position and the calculated temperature being included in the feedback control instead of the measured temperature. The calculation is carried out by using a characteristic curve, which is preferably ascertained by assigning measured flow rates to measured temperatures at a plurality of sampling points above and below the desired setpoint temperature. Care is preferably taken that the ink fill used for this calibration has the correct viscosity. This may preferably be ensured by measuring the viscosity of a sample of the ink close to the setpoint temperature. Further, care is preferably taken that the structural arrangement of all component parts and the thermal insulation of the flow sensor during the calibration correspond to the future configuration after installation of the machine. Instead of the flow itself (value of the flow), a measurement signal dependent on the flow may also be used.

The invention provides the following advantages: since a variation of the ink viscosity is detected, predictive maintenance or a warning to the machine operator is possible; even if the drop formation were to no longer proceed unimpaired because of a change in the ink viscosity at the setpoint temperature according to the specification of the ink, production can still be continued, since the feedback control preferably adjusts the ink temperature that deviates from the setpoint temperature of the specified ink such that the viscosity necessary for proper drop formation is achieved.

In one variant of the invention (in which the temperature auxiliary value is used as the temperature setpoint value for the feedback control), the measured ink temperature at the ink distributor can still be included unchanged in the feedback control. The setpoint value of the temperature at the distributor is regularly varied in relation to the setpoint value predefined at the start (this applies to an unchanged viscosity of the ink), for example according to a current pulse rate of the flow sensor (FS). For this purpose, the temperature setpoint value ascertained from the pulse rate and the characteristic curve of the flow sensor is subtracted from the setpoint value originally predefined in a fixed fashion and the difference is added to the originally predefined setpoint value. The originally predefined setpoint value is replaced with this newly calculated setpoint value. In each subsequent cycle, the respectively preceding setpoint value is overwritten. This is shown by two examples a and b:

a) setpoint value: 30° C.; temperature ascertained from the FS signal and the characteristic curve: 29° C.; difference: 30−29=+1° C.; new setpoint value: 30+1=31° C.;

b) setpoint value: 30° C.; temperature ascertained from the FS signal and the characteristic curve: 31° C.; difference: 30−31=−1° C.; new setpoint value: 30−1=29° C.

In order to keep the temperature difference between the ink temperature in the manifold and the ink temperature in the flow sensor as constant as possible even in the event of external perturbations (for example variation of the ambient conditions) and therefore to keep the corresponding deviations from the characteristic curve as small as possible, an installation position as close as possible to the manifold is preferably provided for the flow sensor; the best possible thermal insulation is also provided for its housing and its lines.

Advantageously, the following is observed for both variants of the invention (according to whether the temperature auxiliary value is used as the temperature actual value or as the temperature setpoint value for the feedback control): the two pressures ("manifold in/out"), i.e. their values or their difference, are preferably feedback-controlled to be constant (in particular by using the pump speed); this feedback control preferably corresponds to the feedback control during the calibration carried out beforehand, i.e. with the same configuration, or the calibration is preferably only carried out in the installed machine.

An example of the function of the invention follows in the case of a variation of the ink viscosity due to ageing of the ink. Under the assumption that the viscosity of the ink varies in relation to the ink specification, for example due to premature ageing, in such a way that the ink flow ascertained at the flow sensor decreases by x %, the following applies:

a) in the former procedure according to the prior art, the feedback control would continue to maintain the ink temperature necessary according to the ink specification and therefore set the viscosity of the ink to be printed too high during the drop formation;

b) in the procedure according to the invention, the ink flow ascertained at the flow sensor (reduced by x %) is converted according to the stored characteristic curve into a correspondingly reduced ink temperature, which deviates downward from the setpoint temperature. This calculated (auxiliary) temperature is now introduced into the feedback control as an actual temperature of the ink. This leads to the feedback control intervening and increasing the actual temperature of the ink. The viscosity of the ink is thereby reduced, and the ink flow through the flow sensor is increased, until the calculated temperature coincides with the setpoint temperature. The fact that the ink has been modified is identified, and it is also ensured that the drop formation continues to proceed correctly, since the viscosity is set correctly again by increasing the ink temperature.

If, for example, it is established by using remote maintenance of the printing machine that the temperature at the ink distributor and the sensor signal of the flow meter in the machine no longer correspond to the stored characteristic curve, there may be primarily two difference reasons for this: 1. the viscosity of the ink has changed; 2. the flow meter is degraded. In order to be able to establish the actual cause, an ink sample may be taken, and its viscosity may be measured and compared with the specification of the ink. If the viscosity of the ink sample should be correct, there is a high probability that the flow sensor is degraded. In this case, either the flow meter is replaced or (if not directly available) the degraded flow meter is recalibrated (as an interim solution) and the corresponding characteristic curve is replaced in the feedback control software. This allows the production capability of the printing machine to be maintained at least in the short term.

If the difference between the ink temperatures at the flow sensor and at the manifold should vary too greatly because of external influences (room climate, ambient conditions) to be able to comply with the tolerance required for the ink temperature that is to be feedback-controlled, a measurement/calibration of the temperature in the vicinity of the flow sensor itself is advantageous. For this purpose, preferably either the temperature sensor already present or an additional temperature sensor installed in the immediate vicinity of the flow sensor (for example in the manifold at the branch point to the flow sensor) or in the branch itself directly before or after the flow sensor, or a flow sensor with an integrated temperature sensor, may be used. If the temperature sensor already present is left in its previous position and the ink temperature in the vicinity of the flow sensor is additionally measured, the deviation of the aforementioned difference that is caused by external perturbations may be corrected by using the additional data thereby obtained.

Measuring the ink temperature in the manifold in the middle of the supply line between the branch points to the print heads has the advantage of a lower average deviation from the ink temperatures inside the individual print heads in comparison with the arrangement directly at the branch point to the flow sensor. If a temperature measurement in the vicinity of the flow meter should be necessary because of external influences, the advantage of the exemplary embodiment mentioned in 3.2. may be maintained by the T measurement additionally being carried out in the vicinity of the flow meter. This, however, requires an additional T sensor (either at the branch point to the flow meter or in the branch of the flow meter or already integrated in the flow meter).

DEVELOPMENTS OF THE INVENTION

Preferred developments of the invention (abbreviated to developments) will be described below. These may also—when it is not technically unfeasible—be combined with one another.

One development may be distinguished in that the flow of the ink is determined as a measurement value. One development may be distinguished in that the measurement value is determined in ml/min or l/min.

One development may be distinguished in that the measurement signal dependent on the flow is one of the following measurement signals: a pulse rate or a pulse spacing or an analog voltage.

One development may be distinguished in that the flow sensor is configured as an impeller sensor.

One development may be distinguished in that the characteristic curve is a characteristic curve between a measured temperature of the ink and the flow of the ink or the measurement signal dependent on the flow. One development may be distinguished in that the characteristic curve is determined by using an ink with a known viscosity. One development may be distinguished in that the characteristic curve is determined at a plurality of sampling points above and below the temperature setpoint value. One development may be distinguished in that a formula is determined for the characteristic curve. One development may be distinguished in that the formula is provided to a device for feedback control of the temperature of the ink.

One development may be distinguished in that the pressure difference of the ink between the entry and the exit of the flow sensor is kept constant. One development may be distinguished in that the pressure of the ink is generated by at least one pump and the pump is operated under feedback control. One development may be distinguished in that speed of the pump is feedback-controlled. One development may be distinguished in that at least one pressure sensor is used for the feedback control of the pressure of the ink.

The features and feature combinations disclosed in the sections above relating to technical field, invention and developments and the section below relating to exemplary embodiments are—in any desired combination with one another—further advantageous developments of the invention.

Other features which are considered as characteristic for the invention are set forth in the appended claims.

Although the invention is illustrated and described herein as embodied in a method for feedback control of the temperature of an ink in inkjet printing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
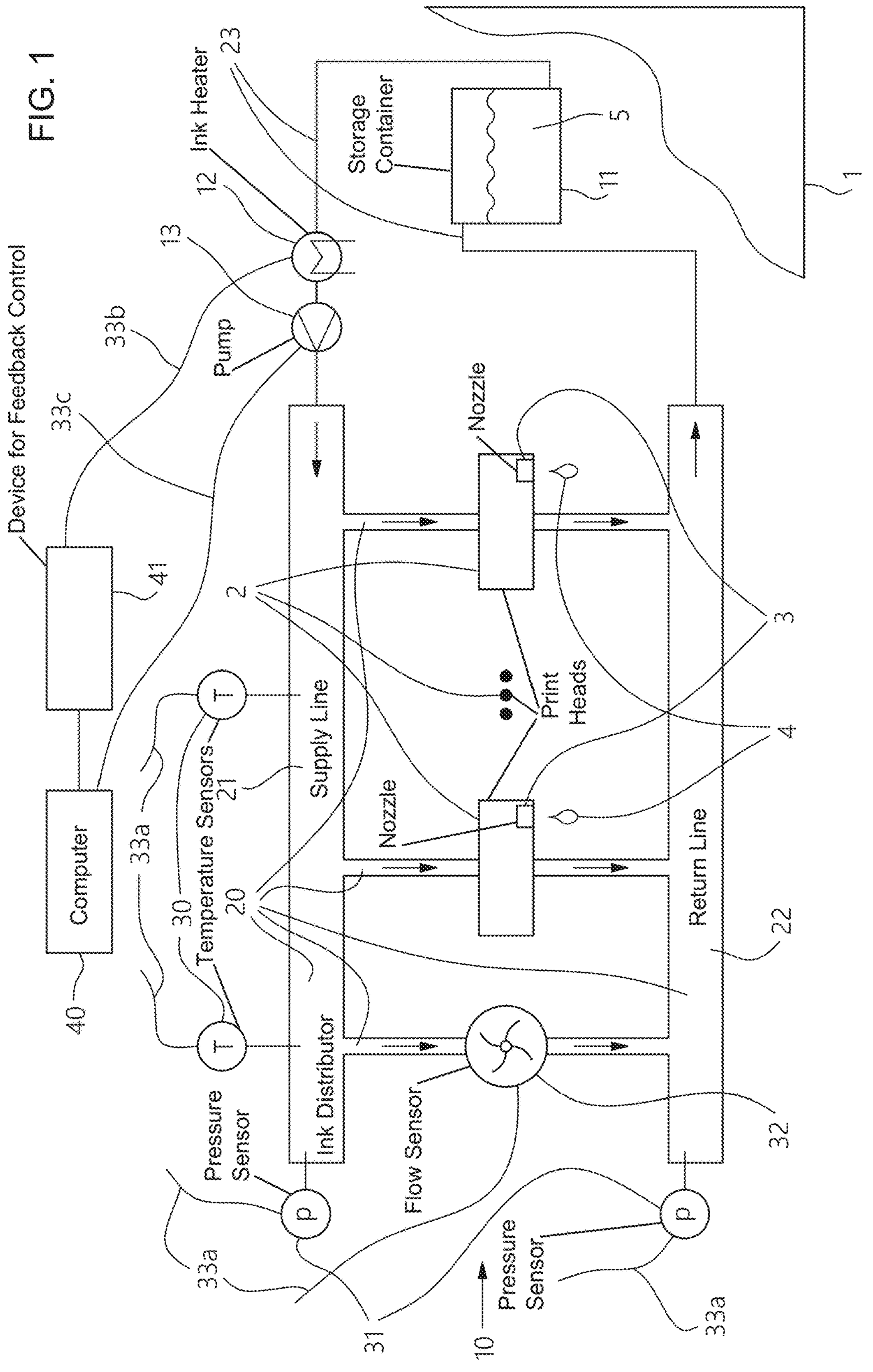
FIGS. 1 and 2 are block diagrams showing a preferred exemplary embodiment of the invention and of developments thereof.

Referring now to the figures of the drawings in detail and first, particularly, to FIG. 1 thereof, there is seen a schematic representation of a view of a preferred apparatus when carrying out a preferred exemplary embodiment of a method according to the invention.

An industrially usable inkjet printing machine 1 (only rudimentarily represented), for example for printing on sheets, webs or labels, includes a multiplicity of print heads 2, each having a multiplicity of nozzles 3 for the generation of drops 4 of liquid ink 5 corresponding to an image. During production, the print heads 2 are preferably stationary and disposed as a so-called print bar transversely with respect to a printing material transport direction. The machine 1 further includes a (digital) computer 40 which may control the printing process and may be used for the inventive feedback control of the temperature of the ink.

The printing machine 1 includes an ink circuit, or a device 10 for the circulating supply of ink to the print heads 2, having a storage container 11, a controllable ink heater 12 and at least one pump 13 for the ink 5, which is controllable (in terms of its speed or its generated volumetric flow). The device 10 supplies the print heads 2 continuously with ink 5 in parallel. For this purpose, an ink distributor 20 with a supply line 21 and a return line 22 (tubes or preferably pipes) is provided. The print heads 2 are disposed parallel to one another between the lines 21 and 22. The ink distributor 20 is connected to the storage container 11 through lines 23 that close the ink circuit.

According to the invention, the temperature of the ink 5 is intended to be feedback-controlled in the ink circuit and therefore also in the print heads 2, it being possible to set the viscosity of the ink 5 that is required for the unimpaired generation of drops by using the temperature. The preferably electrical ink heater 12 is provided for the corresponding thermal adjustment of the ink 5. Measurement values for the temperature control are preferably delivered by at least one temperature sensor 30. This sensor or its sensing element is preferably disposed in the supply line 21. The respective temperature sensor 30 is connected to the computer 40 via a connection 33*a* (only rudimentarily represented). The measurement results of the sensors are therefore available to the computer 40 for processing. The computer is connected to a device 41 for feedback control of the ink temperature. This device 41 is in turn connected to the ink heater 12 via a connection 33*b*. The temperature sensor 30 is preferably disposed close to the branch point at the supply line 21 to the flow sensor 32. Alternatively, for instance, it is disposed in the middle of the supply line 21 between the branch points to the print heads 2. A further temperature sensor (not represented herein) may—as is already known—be disposed close to the heating device 12 and may measure the temperature of the ink just heated by the latter.

The inventive feedback control of the temperature, and therefore of the viscosity, is preferably carried out at a substantially constant pressure of the ink in the ink distributor 20. A pressure sensor 31, or the sensing element thereof, is therefore preferably disposed respectively in the supply line 21 and in the return line 22. The respective pressure sensor 31 is connected to the computer 40 via a connection 33*a* (only rudimentarily represented). The measurement results of the sensor 31 are therefore available to the computer 40 for processing. The measurement results may be used in order to control the pump 13 via the connection 33*c* in such a way that the required liquid pressure of the ink 5 is kept at a constant level. A pressure sensor 31 in each case may measure the hydrodynamic pressure in the supply line 21 and the hydrodynamic pressure in the return line 22, for example at the measurement locations represented in FIG. 1.

According to the invention, the device 10 includes the flow sensor 32 as a flow meter, for example an impeller sensor. The latter is operated (in a "bypass") between the supply line 21 and the return line 22, and in parallel with the print heads 2 located there, and the flow or flow rate or flow quantity of the ink is measured (for example a volumetric flow in ml/min or l/min) or a measurement signal dependent on the flow is generated (for example a pulse rate or a pulse spacing or an analog voltage). The flow sensor 32 is connected to the computer 40 via a connection 33*a* (only rudimentarily represented). Is measurement results or measurement signals are therefore available to the computer 40 for processing.

The computer 40 or the device 41 carries out the following inventive steps of the feedback control: a temperature actual value is compared with a predefined temperature setpoint value and a manipulated variable for a setpoint value of the ink heater 12 is calculated from a setpoint/actual value deviation; the flow or the measurement signal is converted by using a respectively predefined characteristic curve (preferably stored in the computer 40 or in the device 41) into a temperature auxiliary value; and this temperature auxiliary value is used as the temperature actual value or as the temperature setpoint value for the feedback control.

Figure 2:
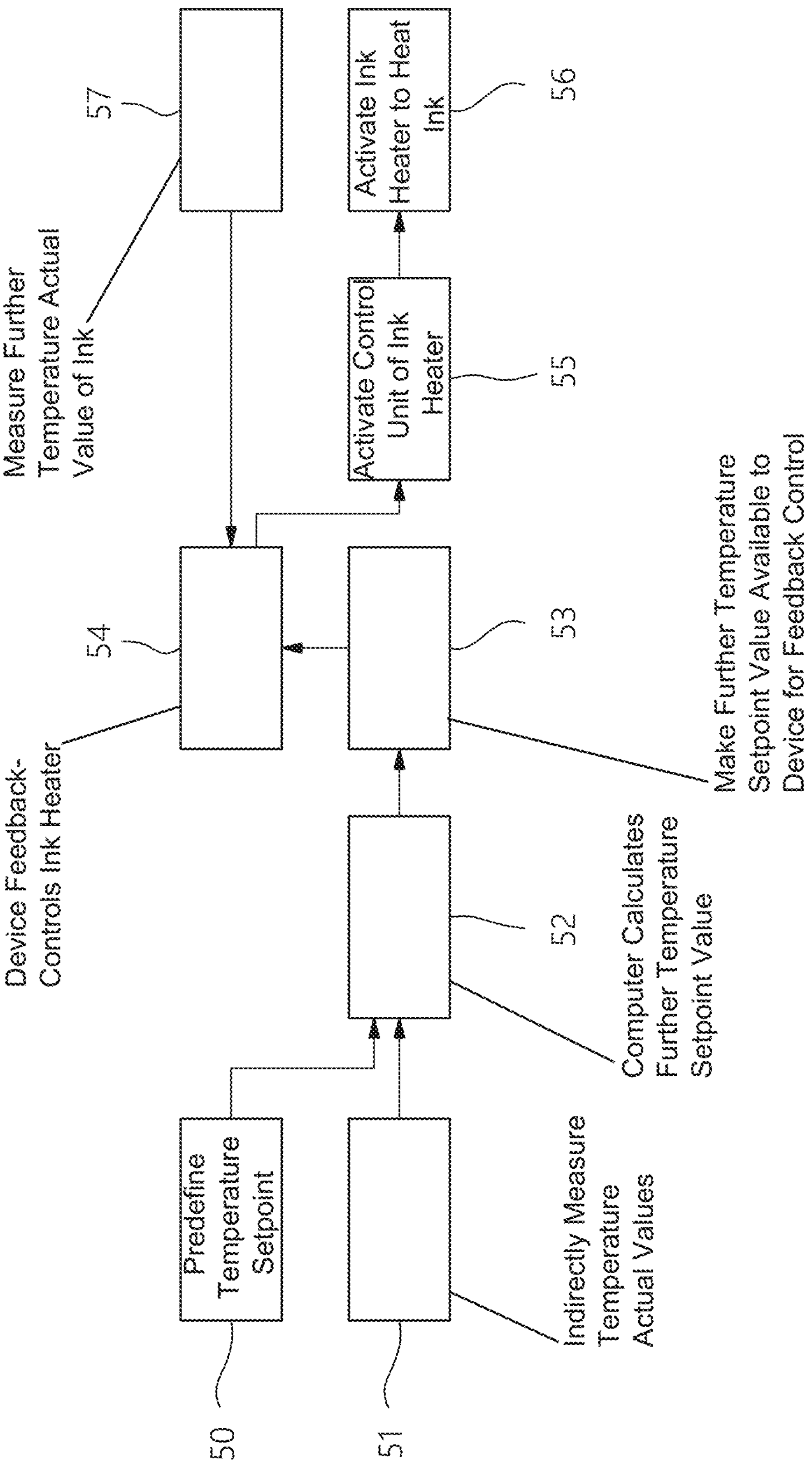

FIG. 2 shows a flowchart of a preferred exemplary embodiment of a method according to the invention, having the following steps:

Step 50: a temperature setpoint value according to the invention is predefined, preferably for a predefined measurement location in the ink distributor 20.

Step 51: an (indirect) measurement of the temperature actual value according to the invention is carried out, preferably at the predefined measurement location in the ink distributor 20. The indirect measurement is carried by using the inventive measurement of the flow and conversion according to the characteristic curve predefined according to the invention (alternatively, by using a measurement signal dependent on the flow).

Step 52: the computer 40 calculates a further temperature setpoint value (which is different from the temperature setpoint value according to the invention) from the two values of steps 50 and 51, preferably for a measurement location at the exit of the ink heater 12. For this purpose, the computer 40 retrieves a previously compiled and stored algorithm, which is optionally based on a further characteristic curve (which is different from the characteristic curve according to the invention). Since the measurement location in the ink distributor and the measurement location for the ink heater are spaced apart from one another, the algorithm will preferably take resulting temperature differences between the two locations into account.

Step 53: the further temperature setpoint value calculated in step 52 is available to the device 41.

Step 54: on the basis of the further temperature setpoint value, the device 41 feedback-controls the ink heater 12, or controls the (e.g. internal) control unit of the latter.

Step 55: the control unit of the ink heater becomes active.

Step 56: the ink heater 12 is activated in such a way that it heats the ink 5 to the further temperature setpoint value.

Step 57: a further temperature actual value of the ink is measured (for example by the further temperature sensor), preferably at the measurement location at the exit of the ink heater 12. This value is available to the device 41 in order to carry out the control step 54.

If, according to the invention, the temperature auxiliary value converted by using the predefined characteristic curve is used as the temperature setpoint value for the feedback control, the temperature auxiliary value is used in step 50, i.e. as the temperature setpoint value there.

If instead, according to the invention, the temperature auxiliary value converted by using the predefined characteristic curve is used as the temperature actual value for the feedback control, the temperature auxiliary value is used in step 51, i.e. as the temperature actual value there.

The following is a summary list of reference numerals and the corresponding structure used in the above description of the invention:

1 inkjet printing machine
2 print head/heads
3 nozzle(s)
4 drop
5 ink
10 device for ink supply
11 storage container
12 ink heater
13 pump for ink
20 ink distributor
21 supply line
22 return line
23 line(s)
30 temperature sensor(s)
31 pressure sensor(s)
32 flow sensor
33*a, b, c* connection(s)
40 computer
41 device for feedback control of the ink temperature
50-57 method steps

The invention claimed is:

1. A method for feedback control of the temperature of an ink in inkjet printing, the method comprising:

pumping the ink through a supply line and a return line of an ink distributor and through print heads supplied in parallel with the ink and disposed between the supply line and the return line;

comparing a temperature actual value with a predefined temperature setpoint value and calculating a manipulated variable for a setpoint value of an ink heater from a setpoint/actual value deviation;

operating a flow sensor between the supply line and the return line and in parallel with the print heads, and using the flow sensor to measure a flow of the ink or generating a measurement signal dependent on the flow; and using a respectively predefined characteristic curve to convert the flow or the measurement signal into a temperature auxiliary value and using the temperature auxiliary value as the temperature actual value or as the temperature setpoint value for the feedback control.

2. The method according to claim 1, which further comprises providing the measurement signal dependent on the flow as a measurement signal being a pulse rate or a pulse spacing or an analog voltage.

3. The method according to claim 2, which further comprises providing the characteristic curve as a characteristic curve between a measured temperature of the ink and the flow of the ink or the measurement signal dependent on the flow.

4. The method according to claim 1, which further comprises providing the characteristic curve as a characteristic curve between a measured temperature of the ink and the flow of the ink or the measurement signal dependent on the flow.

5. The method according to claim 1, which further comprises determining the characteristic curve by using an ink with a known viscosity.

6. The method according to claim 1, which further comprises keeping a pressure difference of the ink between an entry and an exit of the flow sensor constant.

7. The method according to claim 1, which further comprises generating a pressure of the ink by using at least one pump, and operating the at least one pump under feedback control.

8. The method according to claim 7, which further comprises using at least one pressure sensor for feedback control of the pressure of the ink.

* * * * *